United States Patent
Mondal et al.

(10) Patent No.: US 11,391,173 B2
(45) Date of Patent: Jul. 19, 2022

(54) PASSIVE CONTROL OF GAS TURBINE CLEARANCES USING CERAMIC MATRIX COMPOSITES INSERTS

(71) Applicant: General Electric Company, Schenectady, NY (US)

(72) Inventors: Bhaskar Nanda Mondal, Bangalore (IN); John Joseph Rahaim, Cincinnati, OH (US); Thomas Moniz, Loveland, OH (US); Steven A. Ross, Wyoming, OH (US); Joel Kirk, Middletown, OH (US); Scott Hunter, Seattle, WA (US); Daniel Fusinato, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/667,071

(22) Filed: Oct. 29, 2019

(65) Prior Publication Data

US 2020/0131922 A1 Apr. 30, 2020

Related U.S. Application Data

(62) Division of application No. 14/897,823, filed as application No. PCT/US2014/040792 on Jun. 4, 2014, now abandoned.
(Continued)

(51) Int. Cl.
*F01D 11/02* (2006.01)
*F01D 11/18* (2006.01)
*F01D 25/00* (2006.01)

(52) U.S. Cl.
CPC ............ *F01D 11/18* (2013.01); *F01D 11/025* (2013.01); *F01D 25/005* (2013.01);
(Continued)

(58) Field of Classification Search
CPC .... F01D 11/18; F01D 11/025; F05D 2240/11; F05D 2260/30
See application file for complete search history.

(56) References Cited

U.S. PATENT DOCUMENTS 5,092,737 A * 3/1992 Lau .................... F01D 11/18
415/12
5,154,575 A 10/1992 Bonner
(Continued)

FOREIGN PATENT DOCUMENTS

CN 1854468 11/2006
EP 0616113 9/1994
(Continued)

OTHER PUBLICATIONS

International Search Report and Written Opinion issued in connection with corresponding PCT application PCT/US2014040792 dated Sep. 12, 2014.
(Continued)

*Primary Examiner* — Sabbir Hasan
(74) *Attorney, Agent, or Firm* — Dority & Manning. P.A.

(57) ABSTRACT

A passive clearance control limits thermal expansion between stator components relative to rotor components. A control ring controls clearance in a passive manner and is located on or adjacent to stationary components which thermally expand during engine operation. The control ring is formed of material having low coefficient of thermal expansion such as CMCs (Ceramic Matrix Composites) and therefore limits, inhibits or restrains expansion of the adjacent stator components as temperatures increase. Limiting expansion of the stator component reduces rotor/stator clearances and limits parasitic leakage of fluid along the flowpath through the engine core.

10 Claims, 20 Drawing Sheets

Related U.S. Application Data

(60) Provisional application No. 61/833,544, filed on Jun. 11, 2013.

(52) U.S. Cl.
CPC ...... *F05D 2240/11* (2013.01); *F05D 2240/55* (2013.01); *F05D 2260/30* (2013.01); *F05D 2300/5021* (2013.01); *F05D 2300/6033* (2013.01); *Y02T 50/60* (2013.01)

(56) References Cited

U.S. PATENT DOCUMENTS

| | | | | |
|---|---|---|---|---|
| 5,314,303 | A | * | 5/1994 | Charbonnel ............ F01D 11/18 415/115 |
| 5,332,358 | A | | 7/1994 | Hemmelgarn |
| 6,406,256 | B1 | | 6/2002 | Marx |
| 6,935,836 | B2 | | 8/2005 | Ress, Jr. |
| 8,079,807 | B2 | | 12/2011 | Shapiro |
| 8,568,091 | B2 | | 10/2013 | McCaffrey |
| 8,790,067 | B2 | * | 7/2014 | McCaffrey ............. F01D 11/18 415/1 |
| 9,963,988 | B2 | | 5/2018 | Swedowicz et al. |
| 2005/0031446 | A1 | | 2/2005 | Rees |
| 2005/0265827 | A1 | | 12/2005 | Wilson, Jr. |
| 2006/0245910 | A1 | | 11/2006 | Buchal et al. |
| 2007/0276578 | A1 | | 11/2007 | Herron et al. |
| 2012/0301269 | A1 | | 11/2012 | Alvanos et al. |

FOREIGN PATENT DOCUMENTS

| | | |
|---|---|---|
| EP | 2518274 | 10/2012 |
| JP | S55-500212 | 4/1984 |
| JP | S62-502208 | 8/1987 |
| JP | H02-233804 | 9/1990 |
| JP | H06-280615 | 10/1994 |
| JP | H11-062510 | 3/1999 |
| JP | 2001-289059 | 10/2001 |
| JP | 2003-293704 | 10/2003 |
| JP | 2004-332737 | 11/2004 |
| JP | 2011-157968 | 8/2011 |

OTHER PUBLICATIONS

Machine translation and Notification of Reasons for Refusal issued in connection with corresponding JP Application No. 2016-519542 dated Jun. 5, 2018.

* cited by examiner

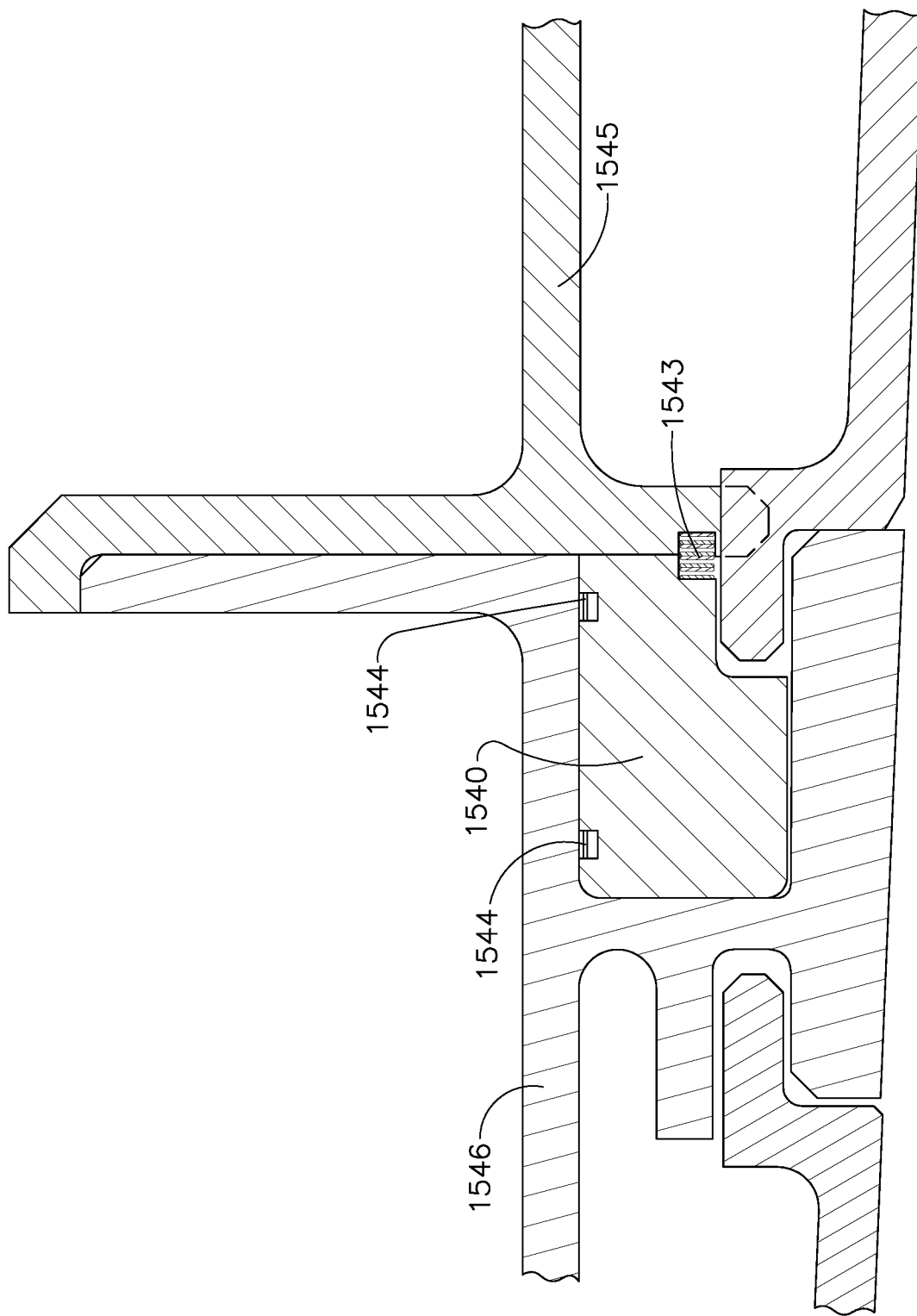

PASSIVE CONTROL OF GAS TURBINE CLEARANCES USING CERAMIC MATRIX COMPOSITES INSERTS

BACKGROUND

Present embodiments relate generally to a gas turbine engine. More specifically, the present embodiments relate, but are not limited, to clearance control structures for stator components disposed opposite or at radially outward areas on rotating portions of the gas turbine engine.

A typical gas turbine engine generally possesses a forward end and an aft end with its several core or propulsion components positioned axially therebetween. An air inlet or intake is located at a forward end of the engine. Moving toward the aft end, in order, the intake is followed by a fan, a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list.

The compressor and turbine generally include rows of airfoils that are stacked axially in stages. Each stage includes a row of circumferentially spaced stator vanes and a row of rotor blades which rotate about a center shaft or axis of the turbine engine. A multi-stage low pressure turbine follows the multi-stage high pressure turbine and is typically joined by a second shaft to a fan disposed upstream from the compressor in a typical turbo fan aircraft engine configuration for powering an aircraft in flight.

The stator is formed by a plurality of nozzle segments which are abutted at circumferential ends to form a complete ring about the axis of the gas turbine engine. Each nozzle segment may comprise a single vane, commonly referred to as a singlet. Alternatively, a nozzle segment may have two vanes per segment, which are generally referred to as doublets. In a third embodiment, additional numbers of vanes may be disposed on a single segment. In these embodiments, the vanes extend between an inner band and an outer band.

A typical gas turbine engine utilizes a high pressure turbine and low pressure turbine to maximize extraction of energy from high temperature combustion gas. The turbine section typically has an internal shaft axially disposed along a center longitudinal axis of the engine. The blades are circumferentially distributed on a rotor causing rotation of the internal shaft. The internal shaft is connected to the rotor and the air compressor, such that the turbine provides a rotational input to the air compressor to drive the compressor blades. This powers the compressor during operation and subsequently drives the turbine. As the combustion gas flows downstream through the turbine stages, energy is extracted therefrom and the pressure of the combustion gas is reduced.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. The stator nozzles turn the hot combustion gas in a manner to maximize extraction at the adjacent downstream turbine blades. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

During such operation of the gas turbine engine, it is desirable to minimize seal leakages or leakage between moving rotor components and the opposed stator component radially outward of the rotor component. Limiting clearance in these areas improves performance of the engine. During operation, the large differences in the thermal and mechanical growth of the rotating and stator components make it difficult to match rotor/stator deflections. When relative deflections increase, rotor/stator clearances increase allowing leakage or increase parasitic flow. Transient mismatch also results in clearance opening during takeoff acceleration. Reducing engine air flow leakage results in improved fuel efficiency and reduced fuel burn.

It would be desirable to overcome these and other deficiencies in order to reduce clearances between rotor and stator components as well as lower exhaust gas temperature overshoot.

BRIEF DESCRIPTION OF THE INVENTION

According to some embodiments, a passive clearance control limits thermal expansion between stator components relative to rotor components. A low coefficient of thermal expansion passive clearance control ring may be located on or adjacent to stationary components which thermally expand during engine operation. The control ring is formed of material with low coefficient of thermal expansion such as CMCs (Ceramic Matrix Composites) and therefore inhibits or restrains expansion of the adjacent stator components as temperatures increase. Limiting expansion of the stator component reduces rotor/stator clearances and limits parasitic leakage of fluid along the flowpath through the engine core.

A clearance control ring assembly comprises a stator component disposed opposite a rotor component within a gas turbine engine, a clearance control ring being formed of a single structure and extending circumferentially disposed radially outward of at least a portion of the stator component, the clearance control ring having a coefficient of thermal expansion which is lower than the at least a portion of the stator component and, the at least a portion of the stator component is limited from thermal expansion and limited from growth from the rotor component.

A clearance control ring assembly comprises a compressor discharge pressure seal stator, a honeycomb abradable opposite a compressor discharge pressure seal rotor, a ceramic matrix composite control ring extending circumferentially about the compressor discharge pressure seal stator, the ceramic matrix composite control ring being a one-piece structure and, the ceramic matrix composite control ring limiting thermal expansion of the compressor discharge pressure seal stator and maintaining tight seal clearance between the seal stator and the seal rotor.

All of the above outlined features are to be understood as exemplary only and many more features and objectives of the passive clearance control in a gas turbine engine may be gleaned from the disclosure herein. Therefore, no limiting interpretation of this summary is to be understood without further reading of the entire specification, claims, and drawings included herewith.

BRIEF DESCRIPTION OF THE DRAWINGS

The above-mentioned and other features and advantages of these exemplary embodiments, and the manner of attaining them, will become more apparent and the clearance control feature will be better understood by reference to the following description of embodiments taken in conjunction with the accompanying drawings, wherein:

FIG. 18 is a side section view of a further alternate embodiment having multiple biasing mechanisms;

DETAILED DESCRIPTION

Figure 1:
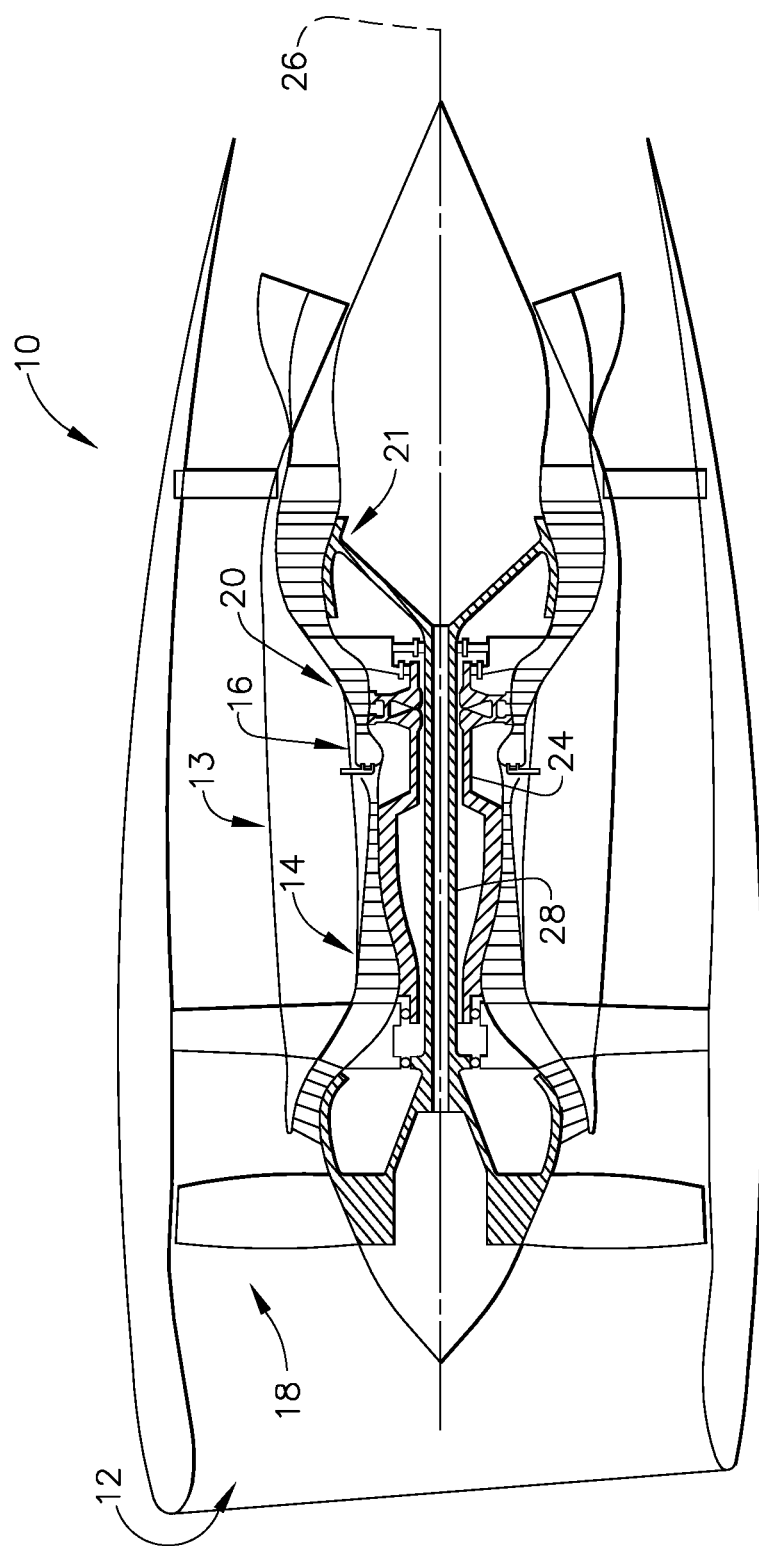
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-21, various embodiments of a gas turbine engine are depicted having a passive clearance control ring. The control ring inhibits thermal growth of itself and adjacent stator hardware to preclude increased spacing between a stator component and a rotor component. As used herein the term stator component refers to a stationary structure and the term rotor component refers to a rotating component rotating relative to the stator component.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions. The term "low coefficient of thermal expansion material" refers to a material which grows relatively less as the temperature increases.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown. The function of the gas turbine engine is to extract energy from high pressure and temperature combustion gases and convert the energy into mechanical energy for work. The gas turbine engine 10 has an engine inlet end 12 wherein air enters the core or propulsor 13 which is defined generally by a compressor 14, a combustor 16 and a multi-stage high pressure turbine 20. Collectively, the propulsor 13 provides thrust or power during operation. The gas turbine engine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24 about engine axis 26. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages.

Figure 2:
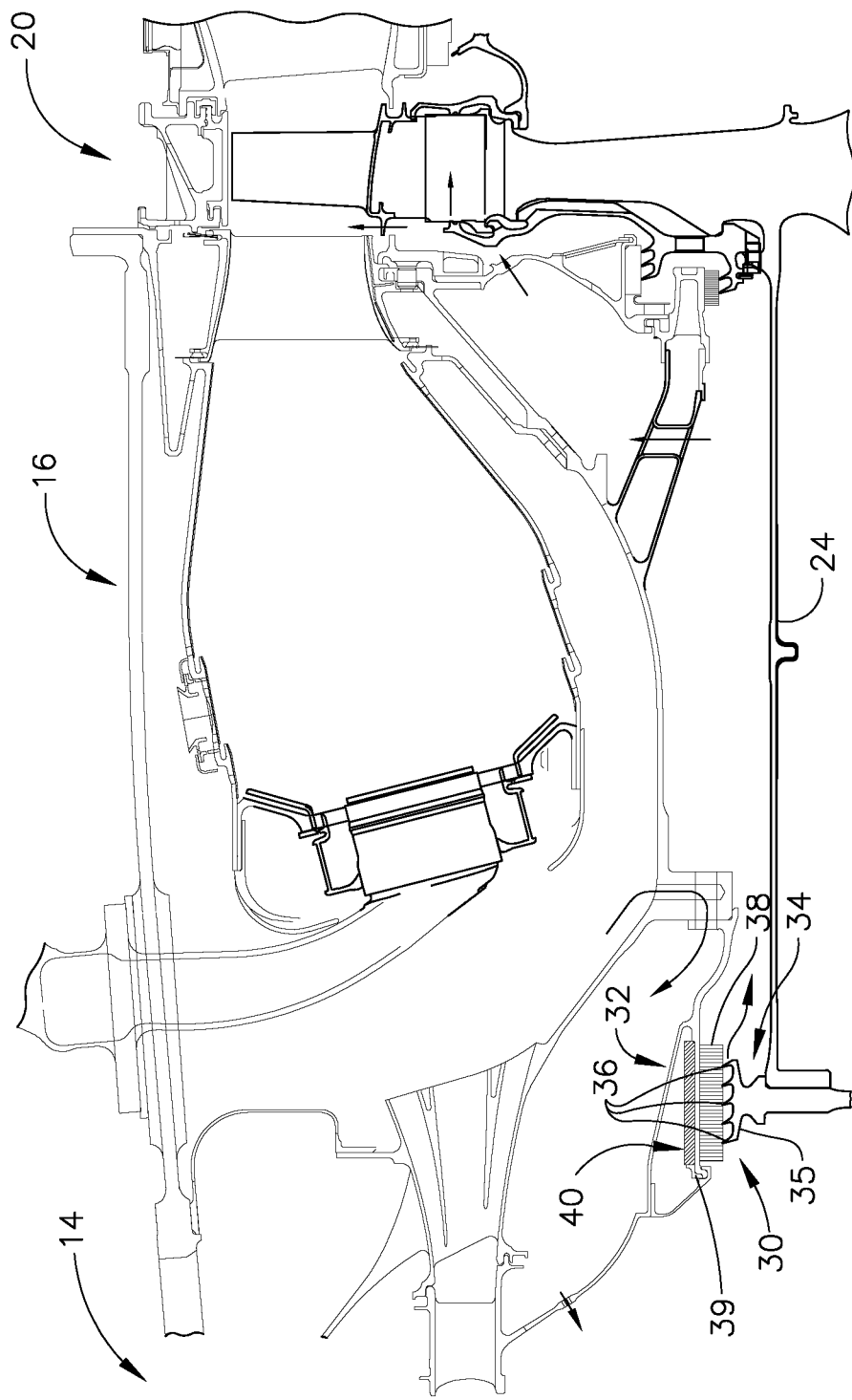
FIG. 2 is a side section view of a control ring near an exemplary interface at the compressor discharge pressure seal.

Referring now to FIG. 2, a side section view of the interface between the compressor 14 and the combustor 16 is depicted. Downstream of the combustor 16, a first stage of the high pressure turbine 20 is shown as well. In the depicted embodiment, a shaft 24 extends from the turbine 20 to the compressor 14 such that rotation of the turbine 20 causes rotation of the high pressure rotor blades within the compressor 14. Along the shaft 24 is a compressor discharge pressure seal 30. The seal 30 includes a stator component 32 and a rotor component 34. The rotor component 34 of the instant embodiment is depicted as a labyrinth seal 35 having a plurality of seal teeth 36 extending generally radially outward. The stator component 32 is disposed opposite the rotor component 34 and according to the instant embodiment, comprises at least an abradable surface, such as a honeycomb material 38 and a support arm 39. The honeycomb structure 38 is disposed upon a support arm 39. Since this picture is shown in section, one skilled in the art will understand that the support arm 39 extends circumferentially about an engine center line 26 (FIG. 1). Likewise, the abradable material 38 also extends circumferentially. The circumferentially extending abradable material 38 may be formed in multiple circumferential segments or a unitary structure.

Disposed radially outward of the seal support 39 is a ceramic matrix composite control ring 40. The ceramic matrix composite control ring 40 provides a low alpha material circumferentially extending about the stator component of the seal 30. According to some embodiments, the control ring may be formed of ceramic matrix composite (CMCs). However, other materials may be utilized such as IN 909. The control ring 40 typically has a lower coefficient of thermal expansion than other materials about which the control ring 40 is disposed. Therefore, the control ring 40 limits thermal movement of the stator component or components 32. The clearance control ring 40 extends 360 degrees along an outer surface of the seal support arm 39. During normal operation, the seal support arm 39 and/or honeycomb material 38 expand radially outward. The control ring 40 limits thermal growth of the stator component 32 in the radially outward direction. This arrangement provides for a tighter clearance between the rotor component 34 and the stator component 32 at operating temperature and condition where thermal expansion normally increases clearance between rotor components 34 and stator components 32.

Figure 3:
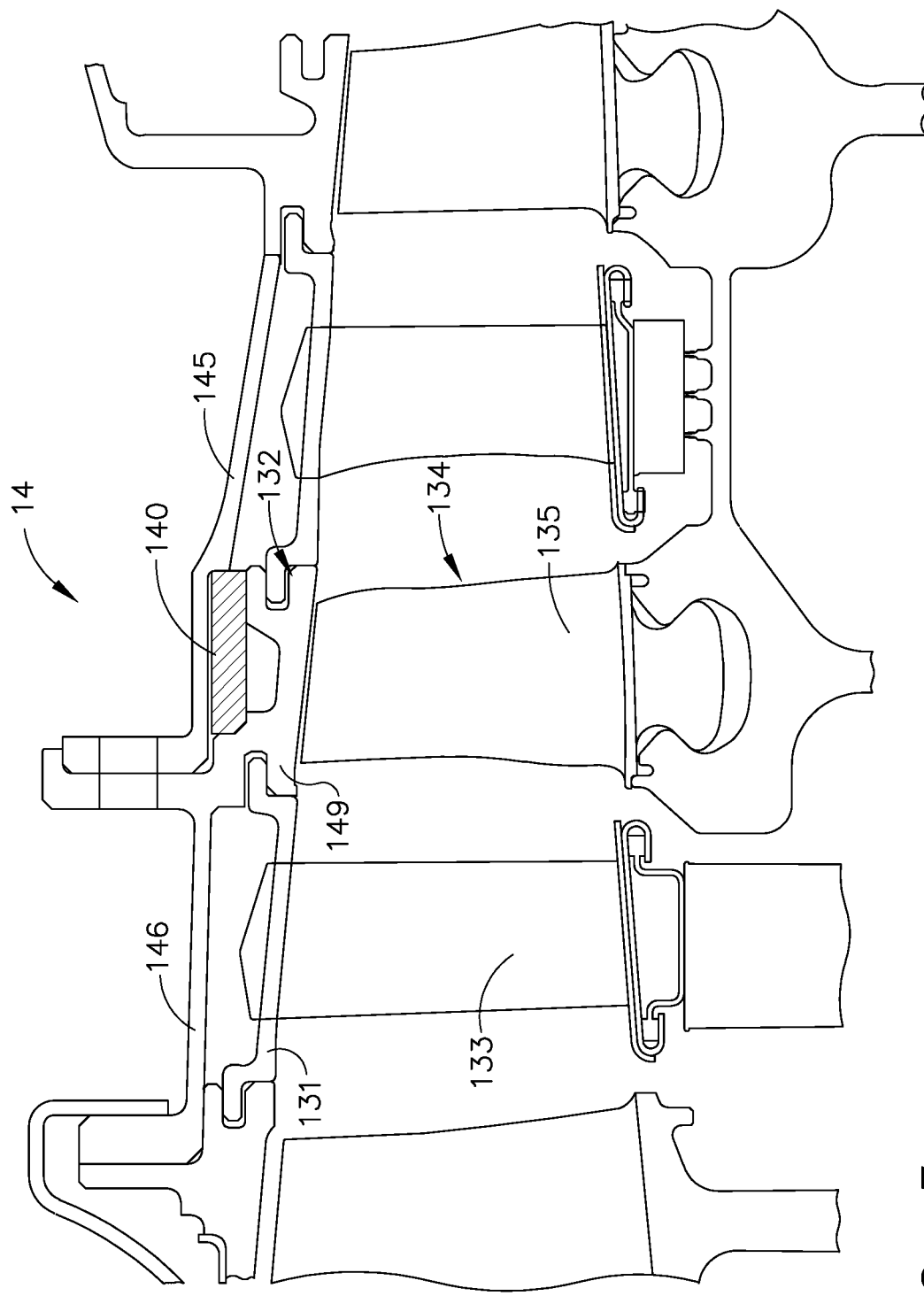
FIG. 3 is an exemplary control ring arrangement within a compressor.

Referring now to FIG. 3, a side section view of a schematic high pressure compressor 14 is depicted in the instant embodiment. The control ring embodiment may be used alternatively to limit clearance between a rotating compressor blade 135 and an outer wall of the compressor to limit air leakage. An exemplary compressor 14 includes an aft case 146 associated with a pair of rotor and stator components 134, 132 which may be at any of various stages of the compressor 14. The exemplary aft case 146 is formed of a first portion 146 and a second portion 145. The first aft case 146 includes a blade shroud ring 149 which defines at least a portion of the stator component 132 and is opposite the compressor blade 135. The blade shroud ring 149 defines an outer wall of the airflow path within the compressor 14. Beneath the aft case 146 is a vane 133 and platforms 131. The vane 133 turns air in a desired manner to increase energy extraction at the adjacent downstream blade 135. The upper platform 131 is received in part by portions of the aft case 146. For example, the platform 131 may include a flange, rib or finger at axial ends to be received by grooves of the adjacent aft case members. Alternatively, the platform may have a groove which receives a flange or the like from the case 146. Other retaining embodiments may be utilized and these descriptions are not limiting.

The stator component 132 is depicted opposite a rotor component 134. As described in this embodiment, the stator component 132 is a blade ring 149 which is formed by the aft case 146. Opposite the stator component 132 is the rotor component 134, which according to the instant embodiment, is defined by the compressor blade 135. In order to inhibit thermal growth in a radially outward direction and limit clearance increase between the blade 135 and the blade shroud ring 149 a control ring 140 is disposed about the blade ring portion of the aft case 146. Positioned radially outward of the stator component 132 is a ceramic matrix component control ring 140. The control ring 140 may be of a unitary or one piece circumferential structure and may have various cross-sectional shapes. For example, according to the embodiment depicted, the cross-section of the structure is generally rectangular and may have curved or sharp corners. However, this is merely exemplary as will be seen, various shapes may be utilized. As with previous embodiments, the ceramic matrix composite control ring 140 limits the growth of the stator component 132 relative to the rotor component 134 at operating temperature which limits leakage of air flow around the rotor. In normal operation, the blade shroud ring 149 may generally grow outwardly away from the blade 135 due to thermal conditions. The instant control ring 140 inhibits such growth beyond desired amount thus limiting increased clearance. The control ring 140 is surrounded by an aft case 145 providing an upper support and the adjacent aft case 146 providing a lower support for the control ring 140. Above the control ring 140, the aft cases 145, 146 may be bolted together.

Figure 4:
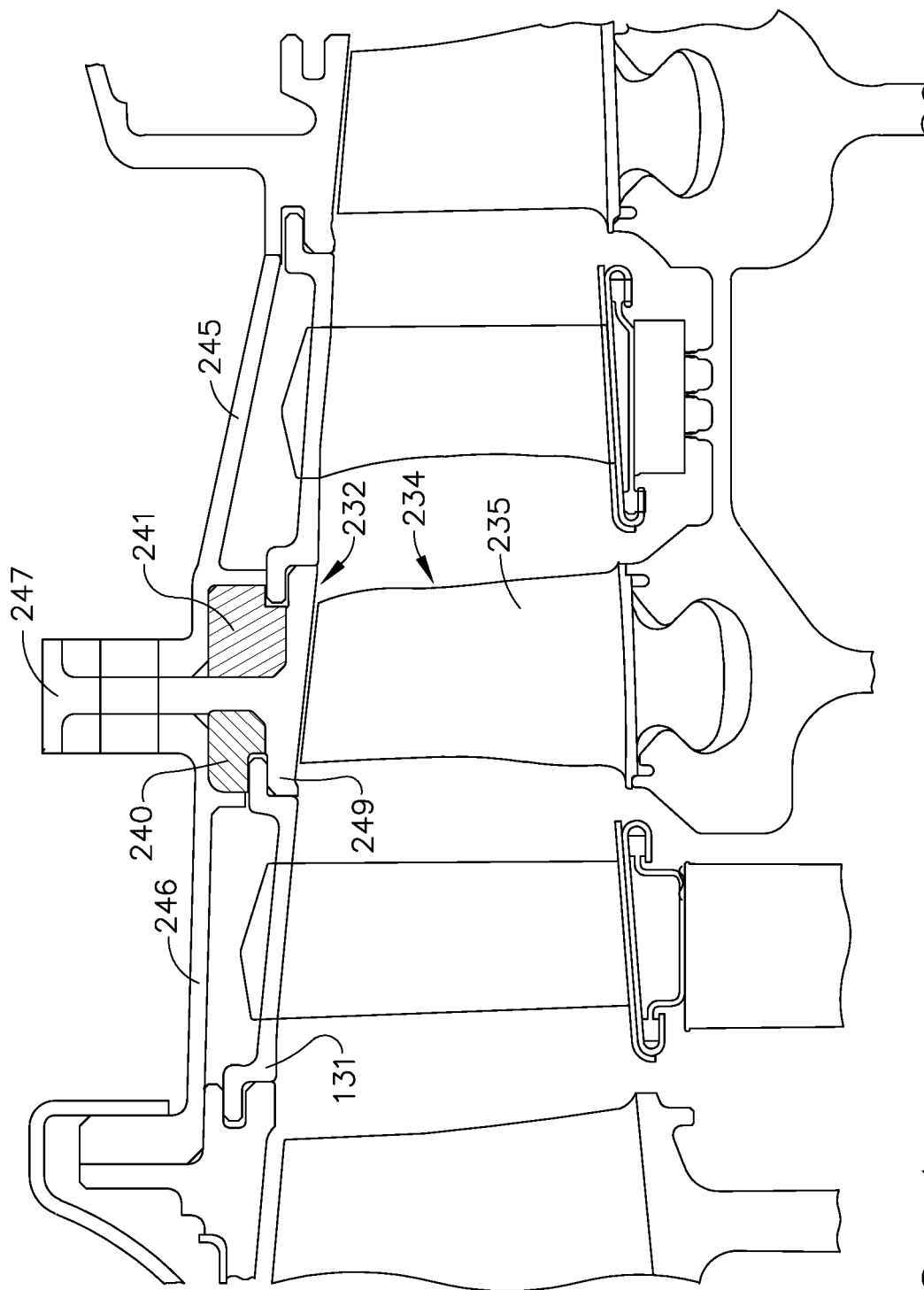
FIG. 4 is a further exemplary embodiment of control rings.

Referring now to FIG. 4, a side section schematic view of an alternate embodiment of the high pressure compressor 14 is depicted. In this embodiment, a rotor component 234 is again disposed opposite a stator component 232. The stator component 232 is defined by a mid-case member 247 which has a generally I-shaped cross-section and is connected to and disposed between the aft case members 245, 246. The mid-case member 247 extends circumferentially about the engine center line. The lower portion of the mid-case member 247 is spaced from the aft case members 245, 246 and defines a blade shroud ring 249. Beneath the blade shroud ring 249 is a blade 235 which rotates about the engine center line. As with the previous embodiment, a platform 131 is disposed beneath aft cases 245, 246. Within this space between the blade shroud ring 249 and the cases 245, 246 is at least one ceramic matrix composite control rings 240, 241. According to the instant embodiment, two rings 240, 241 are utilized—one on each side of the web of the mid-case member 247. These control rings 240, 241 extend circumferentially about the axis of the engine 10 and are formed of generally L-shaped structures to fit within the confined space between the mid-case 247, the aft cases 245, 246 and vane platforms engaging the mid-case member 247 and the aft cases 245, 246. These rings 240, 241 inhibit thermal growth in radial outward direction of the stator component 232 relative to the rotor component 234. Thus, the function of limiting separation between the stator and rotor components provides improved sealing of air flow in this region of the engine 10.

Figure 5:
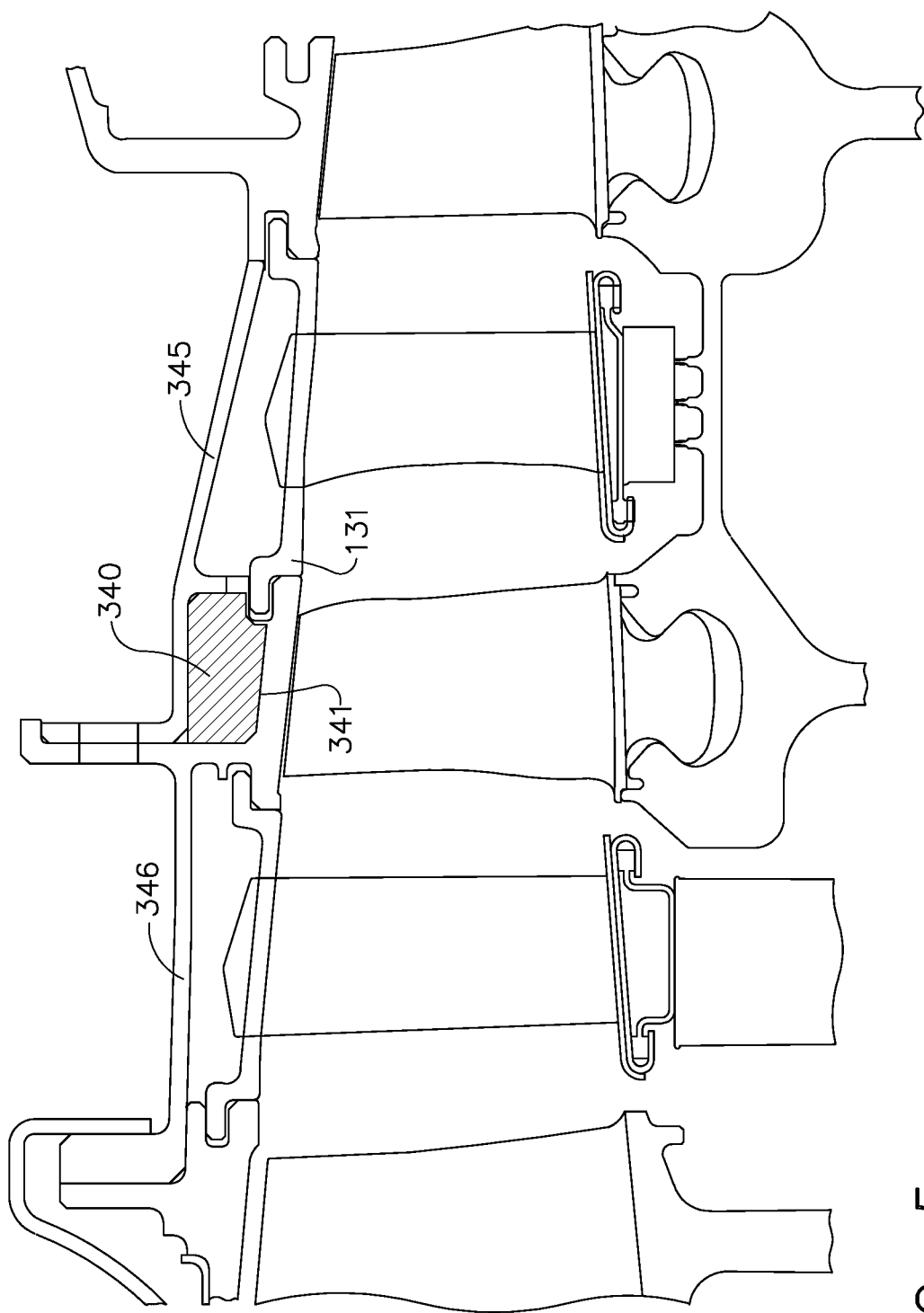
FIG. 5 is a still further exemplary embodiment of a control ring.

Referring now to FIG. 5, a further alternative embodiment is depicted wherein aft cases 345, 346 provide a space wherein a ceramic matrix composite control ring 340 is located. In this embodiment, the aft cases 345, 346 are similar to those shown in FIG. 3. However, in this embodiment, the control ring 340 is generally rectangular shaped with one corner partially removed. This allows for positioning of a vane platform 131. In this embodiment also, a lower side 341 of the control ring 340 is not parallel with the opposite long edge but instead extends at an angle to the central axis of the engine 10. The control ring 340 is again captured between the case 346 on a lower surface and the case 345 on an upper surface and a portion of the adjacent vane platform 131.

Figure 6:
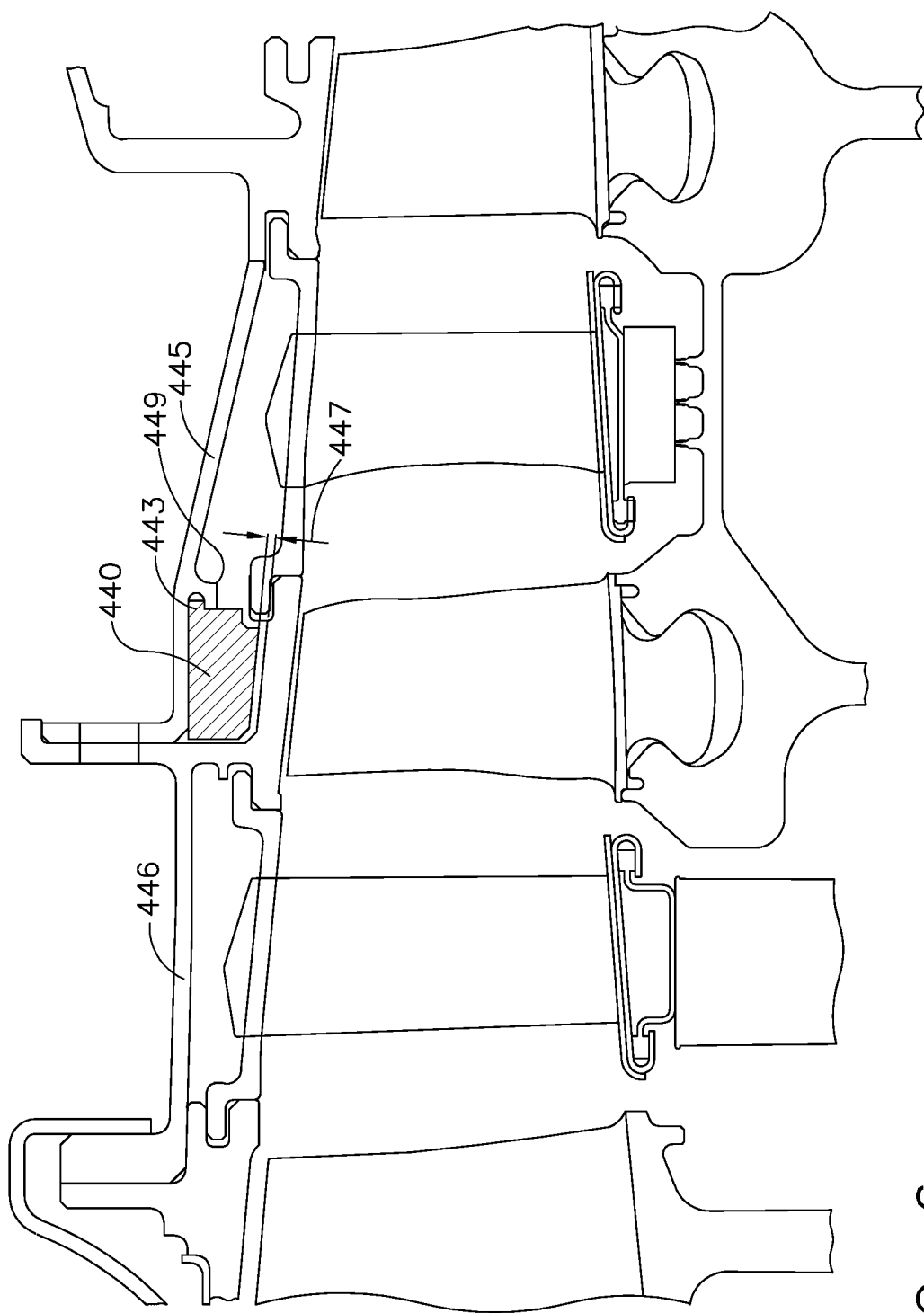
FIG. 6 is a further embodiment with a retaining shoulder arrangement.

Referring now to FIG. 6, an alternate embodiment of assembly FIG. 5 is depicted in side section view. The aft case 445 includes a retaining shoulder 449. The control ring 440 includes a projection 443 which engages the retaining shoulder 449 of the aft case 445. These structures may be reversed.

A second difference in the embodiment of FIG. 6 than that of FIG. 5 is a gap 447 between the bottom surface of the control ring 440 and the upper surface of aft case 446, which is positioned below the control ring 440. The gap 447 is provided between the ring 440 and the base ring of the aft case 446. The gap is used to delay contact between the shroud and control ring until a specific engine cycle condition is reached. By setting this gap, and the point where contact occurs, deflections are tuned to meet minimum clearances across all operating conditions. Minimum attainable average clearances will result in maximum performance for a given mission.

Figure 7:
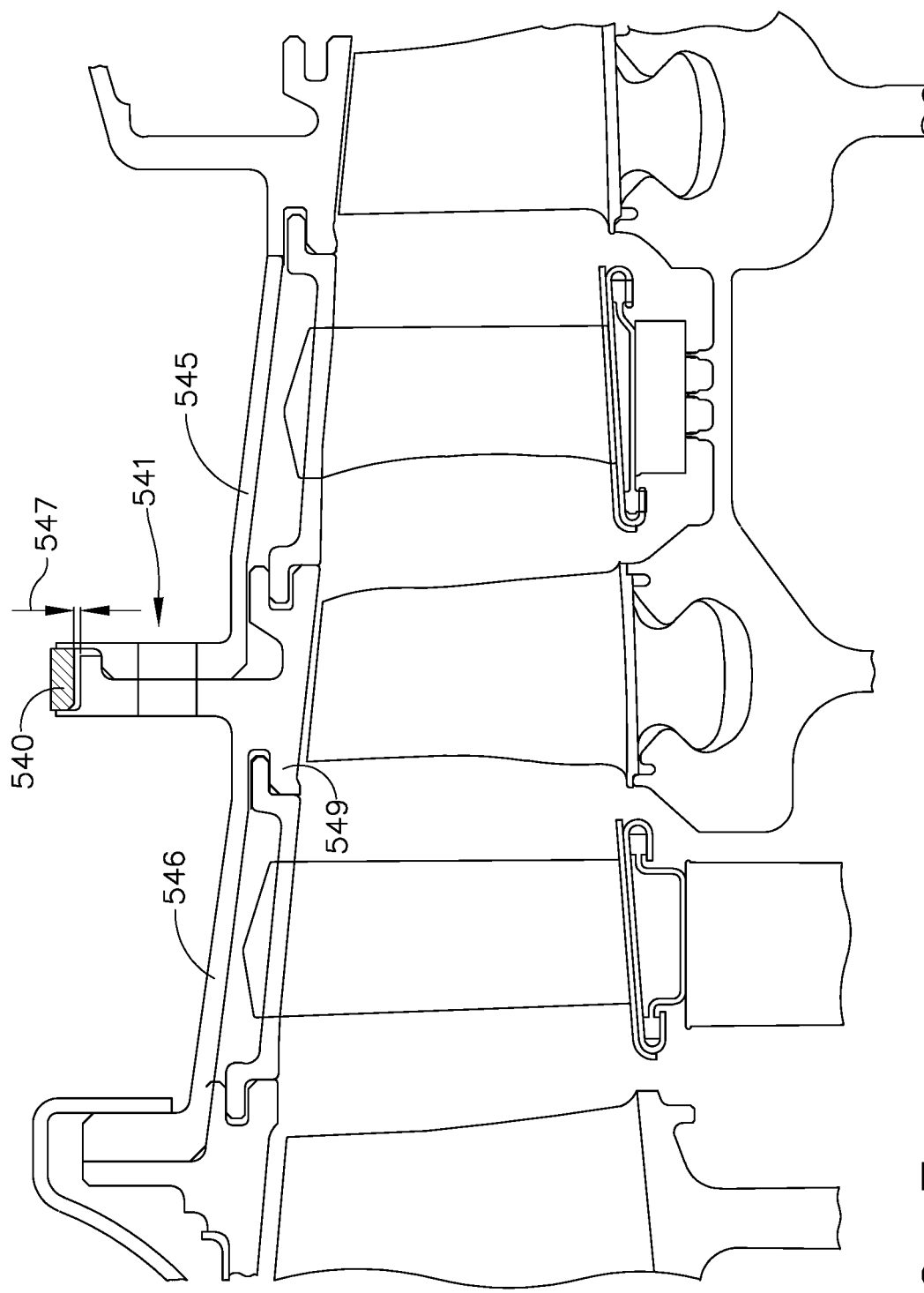
FIG. 7 is a further embodiment having a ring at radially outward position of case flanges.

Referring to FIG. 7, an embodiment of the ceramic matrix control ring 540 is depicted disposed about an upper interface or flange 541 between aft cases 546 and 545. The gap 547 is provided between the control ring and the aft cases so that contact is delayed. When the aft cases 545, 546 are bolted together, the control ring 540 is captured therebetween and limits radially outward growth of the cases 545, 546, such that blade shroud ring 549 cannot expand, or expand beyond a desired amount, due to thermal expansion.

Figure 8:
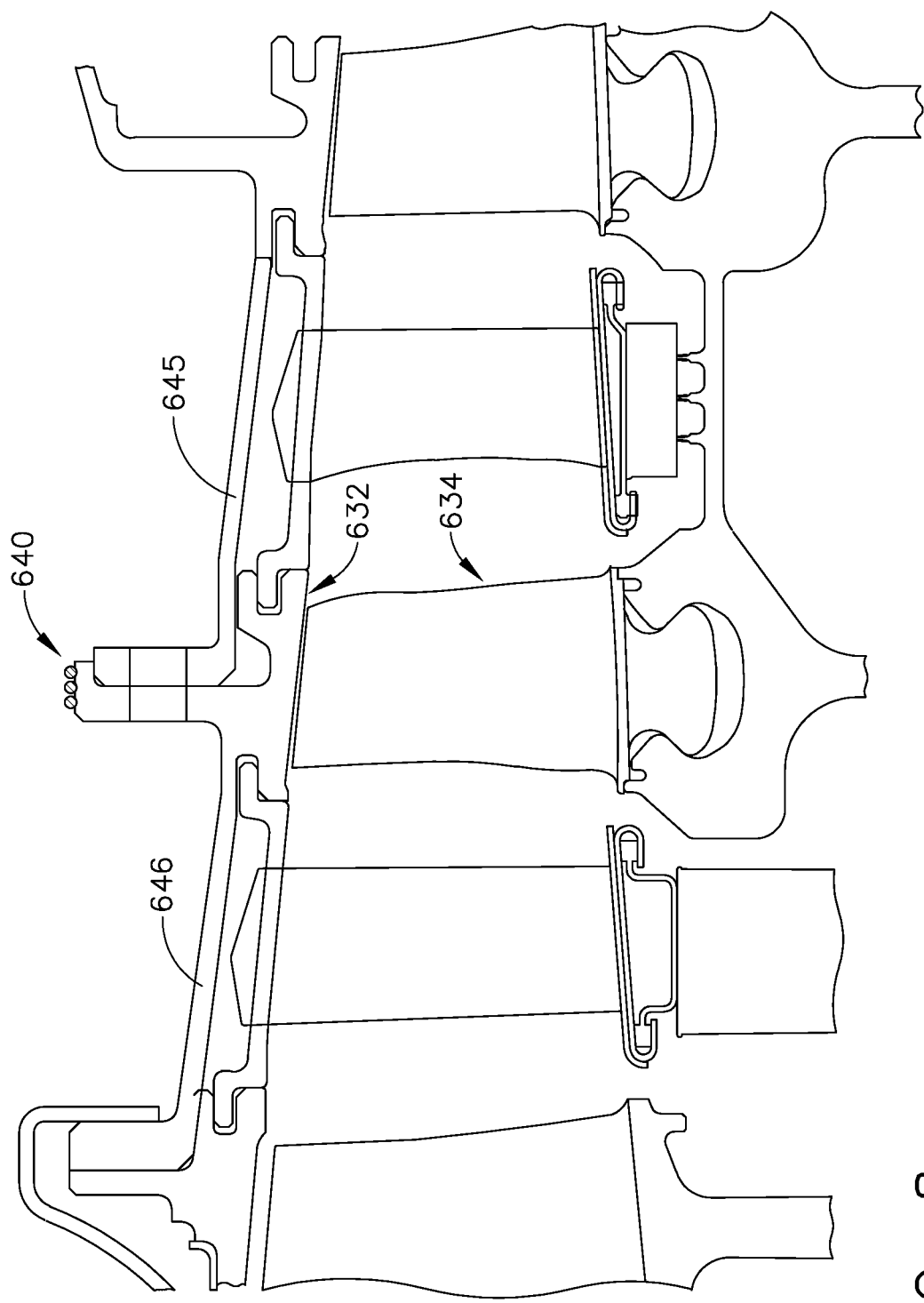
FIG. 8 is a further embodiment having a plurality of control wraps.

Referring now to FIG. 8, an alternate embodiment is depicted wherein a plurality of ceramic matrix composite wraps 640 are circumferentially positioned about the radially outer edge of at least one flange of one or both of the aft cases 645, 646. The circumferential position of the wraps 640 inhibits thermal growth of the cases 645, 646. In turn this limits clearance between the rotor component 634 and the stator component 632 as previously described. The wraps 640 may include one or more wraps which may be formed of various cross-sectional shapes. The cross-sectional shapes may all be the same or may differ. In the instant embodiment, the wraps are circular in cross-section and are of the same shape.

Figure 9:
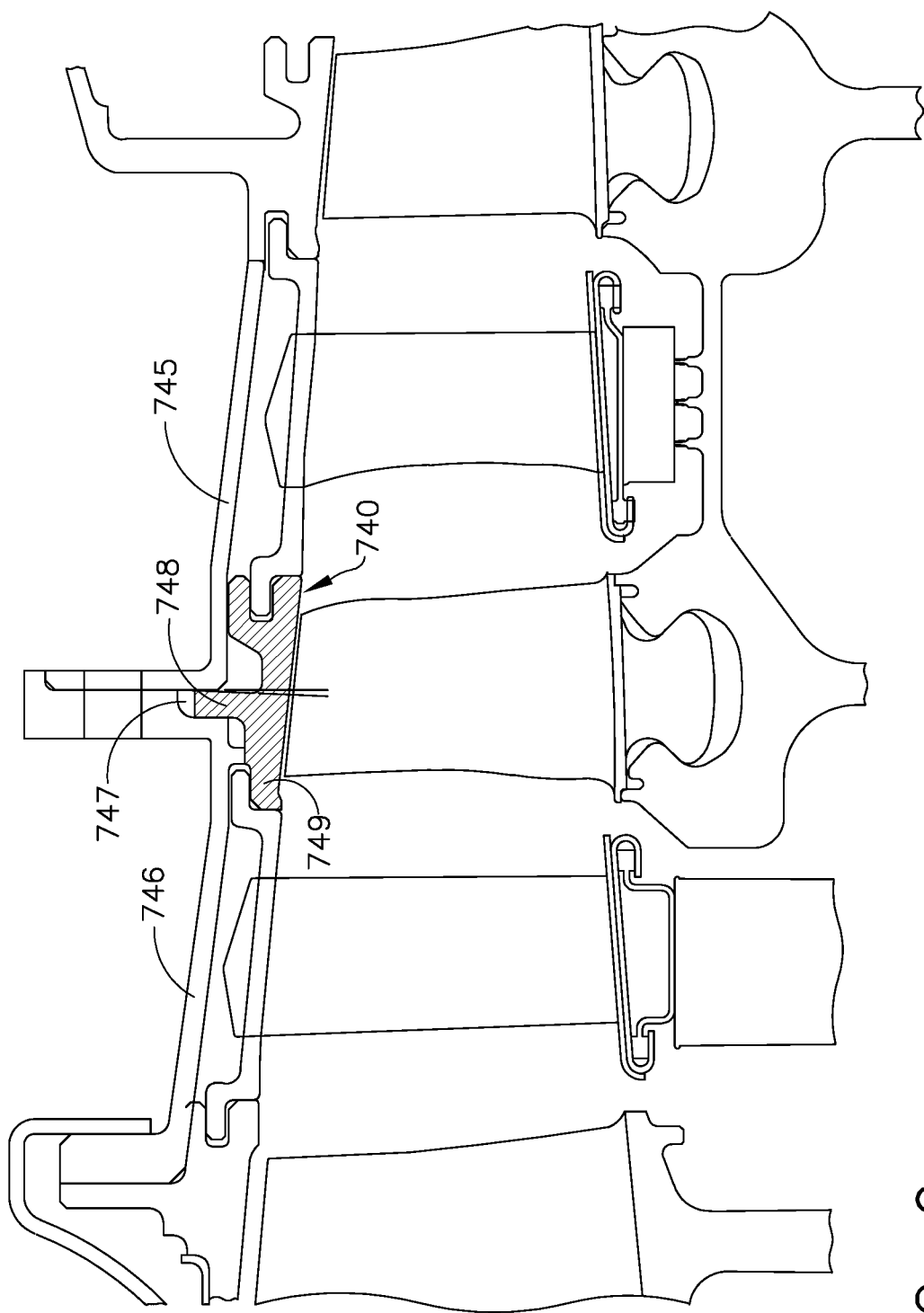
FIG. 9 is a control ring embodiment having an angled surface for engagement with the casing.

Referring now to FIG. 9, the aft cases 746, 745 include flanges extending radially relative to the engine axis and include a gap 747 therebetween wherein a rib structure 748 of a control ring 740 extends into. One of the flanges of the cases 745, 746 may be at a slight angle relative to the radial direction so that the control ring 740 is slightly wedged within the gap between the flanges of the cases 746, 745. The control ring 740 also defines a blade shroud ring 749 defining structure to maintain blade tip clearance.

Figure 10:
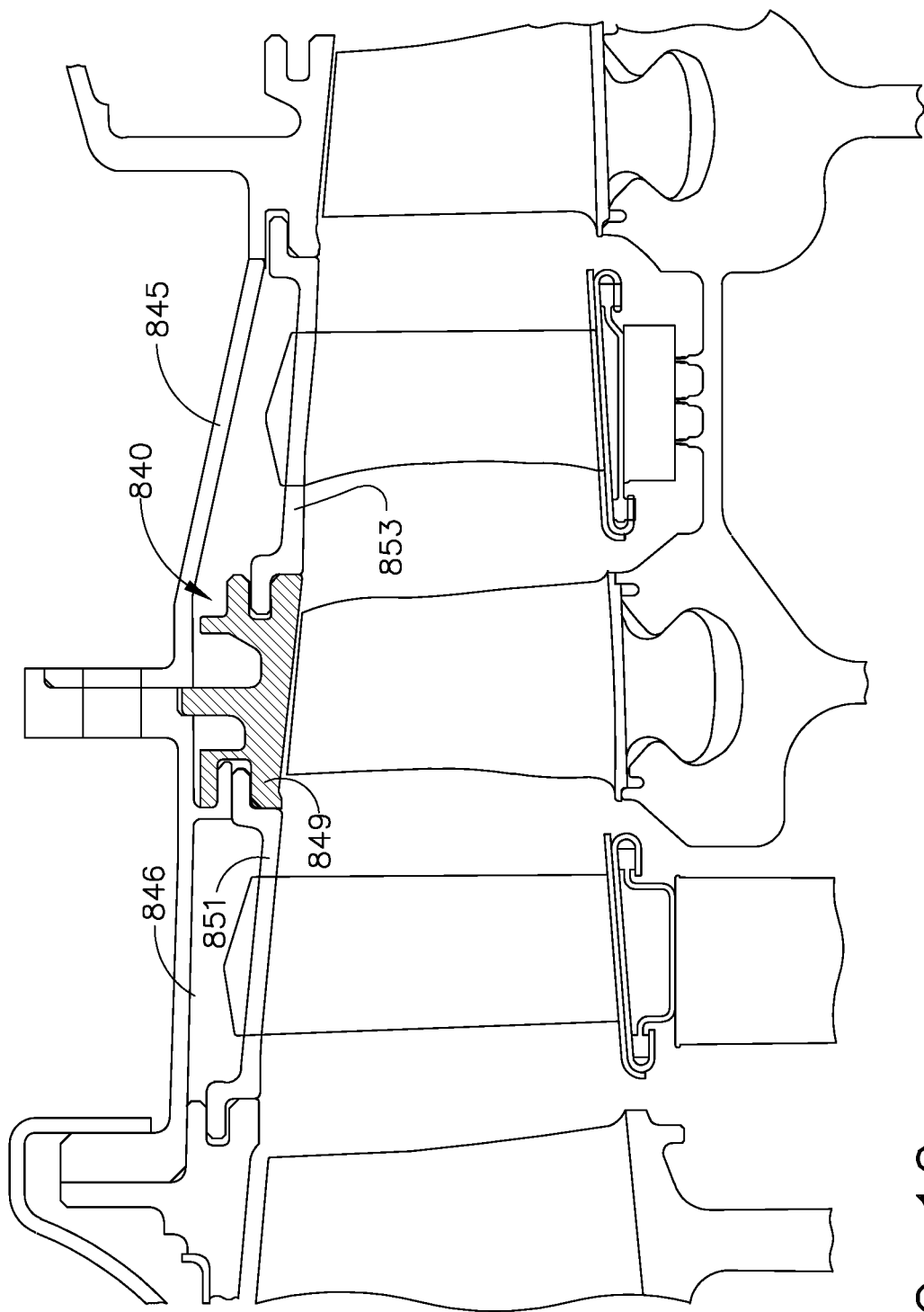
FIG. 10 is a control ring with flanges to capture vane platforms and/or case structures.

Referring now to FIG. 10, an alternate embodiment is shown with aft cases 845, 846. A control ring 840 is interlocked between the cases 846, 845 and receives flanges of adjacent veined platform hangers 851, 853. Again, with the instant embodiment, the control ring 840 defines the blade shroud ring 849 and therefore the blade tip clearance is limited from expanding during operating conditions.

Figure 11:
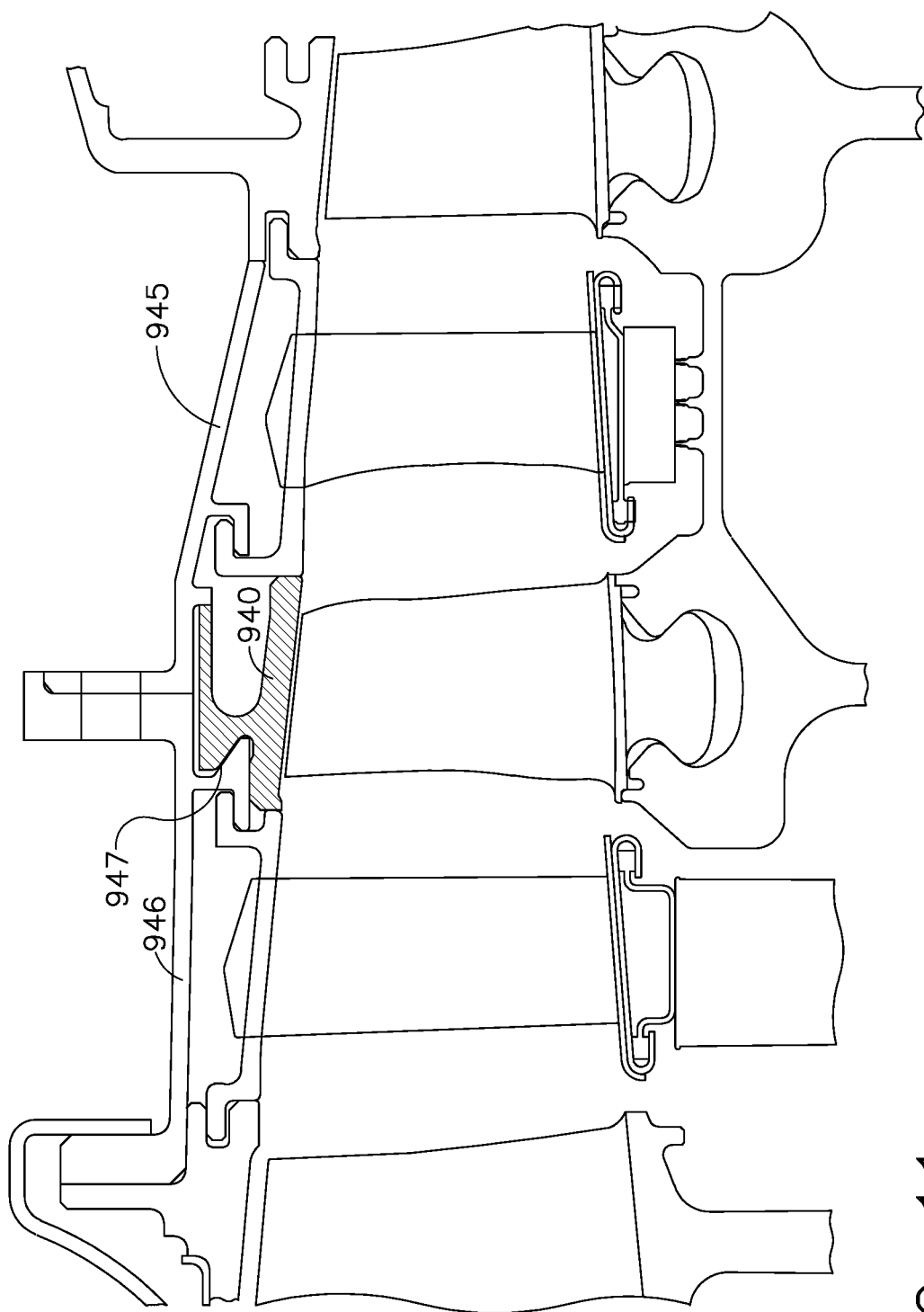
FIG. 11 is an embodiment of a movable control ring which closes a gap as an adjacent case structure expands.
Figure 12:
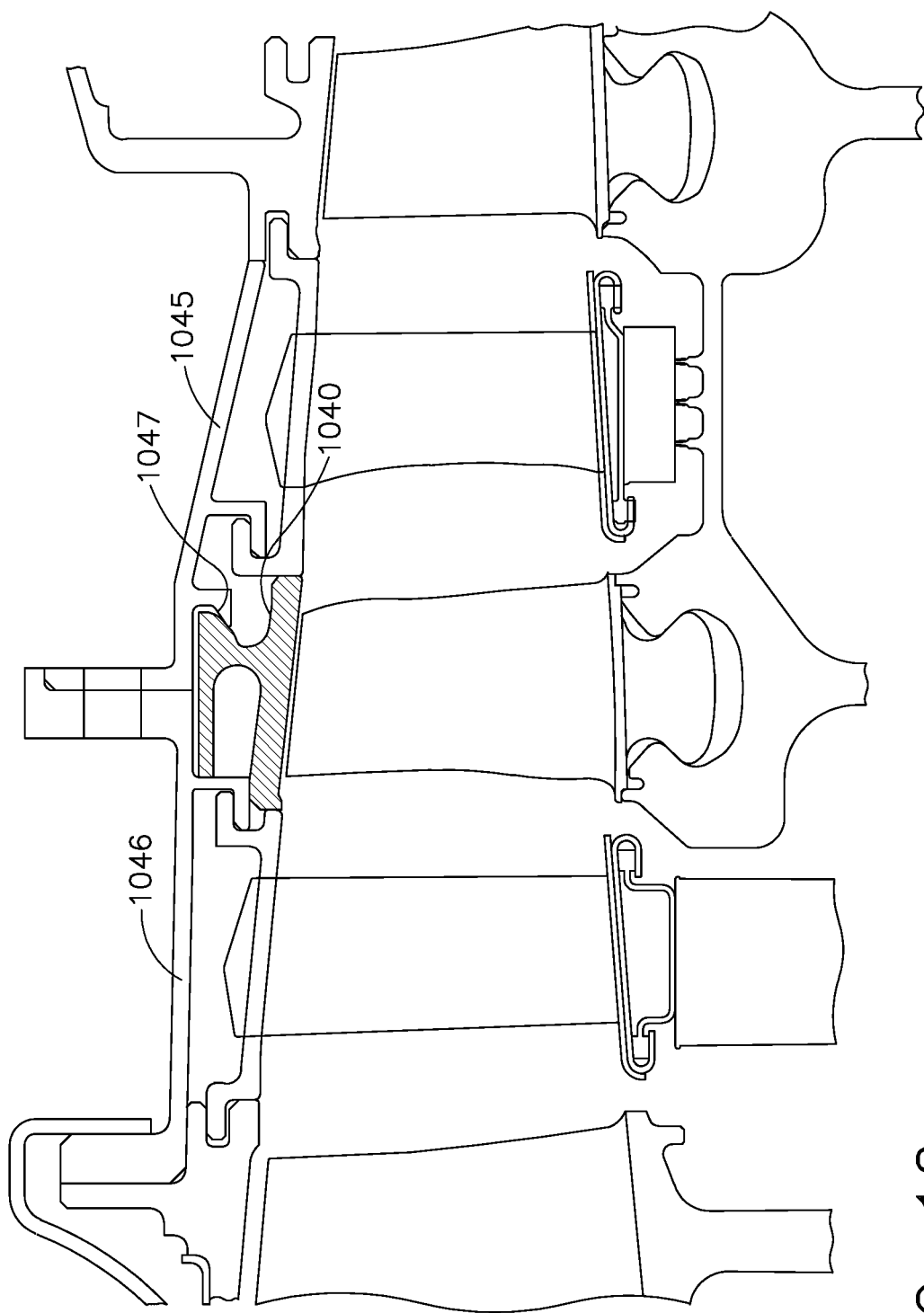
FIG. 12 is an alternate embodiment of FIG. 11.

Referring now to FIGS. 11 and 12, views are depicted of aft cases 945, 946 and 1045, 1046 having oppositely oriented control rings 940, 1040. The cases 946 and 1045 have angled surfaces 947, 1047 which engage correspondingly angled surfaces of control rings 940, 1040. As the cases grow with temperature rise in an axial direction, the control rings 940, 1040 slide downwardly to maintain or reduce the blade shroud ring to blade tip gap. Again, the desired function being to reduce parasitic air flow leakage. These embodiments also depict the control rings 940, 1040 defining the blade shroud ring opposite the rotor component.

Figure 13:
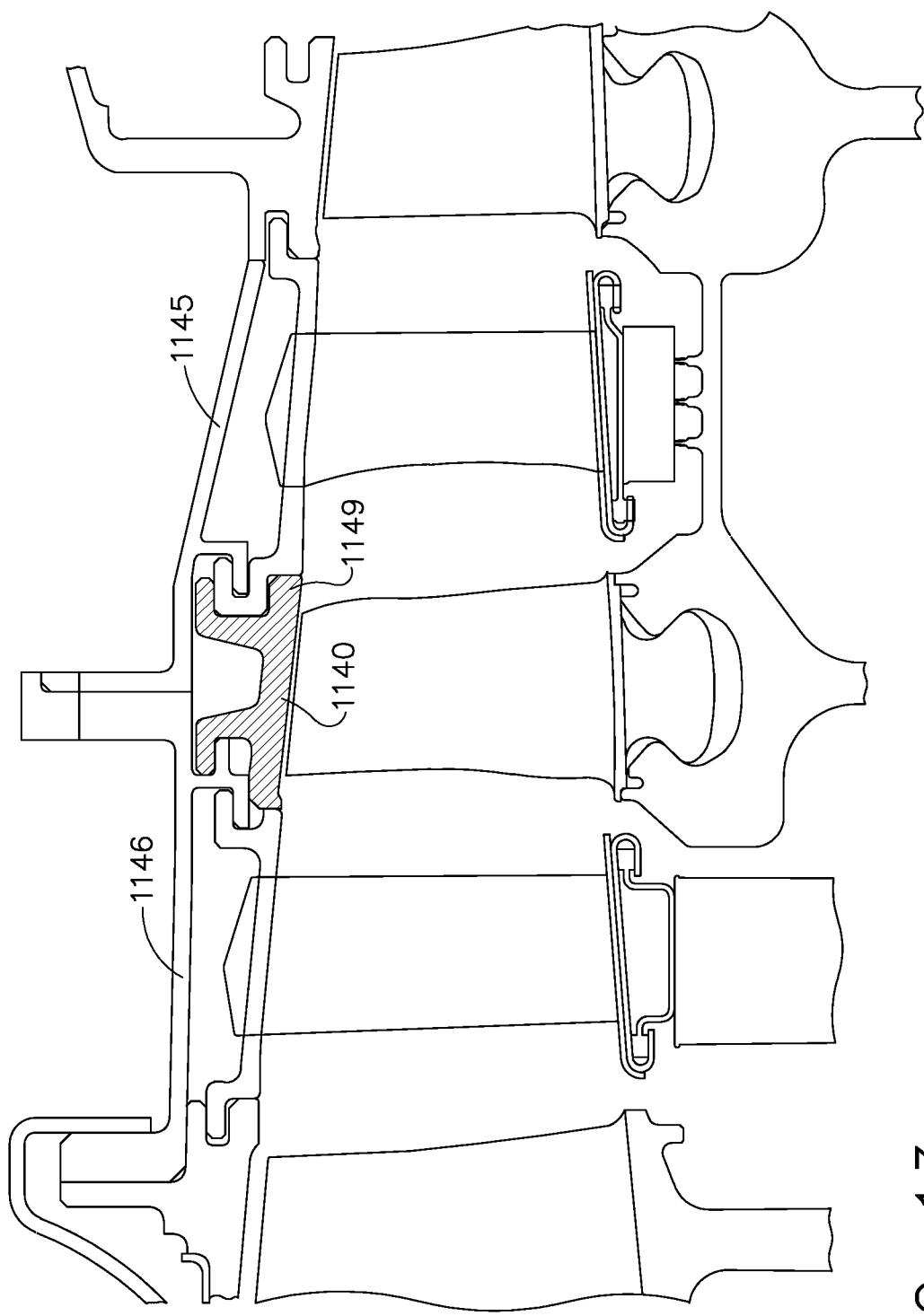
FIG. 13 is a control ring which serves as a blade shroud ring.

Referring now to FIG. 13, aft cases 1146, 1145 are positioned wherein a control ring 1140 is captured between axially extending flanges of each of the cases 1145, 1146. The control ring 1140 defines the blade shroud ring 1149 inhibiting thermal growth and leakage of air due to thermal expansion.

Figure 14:
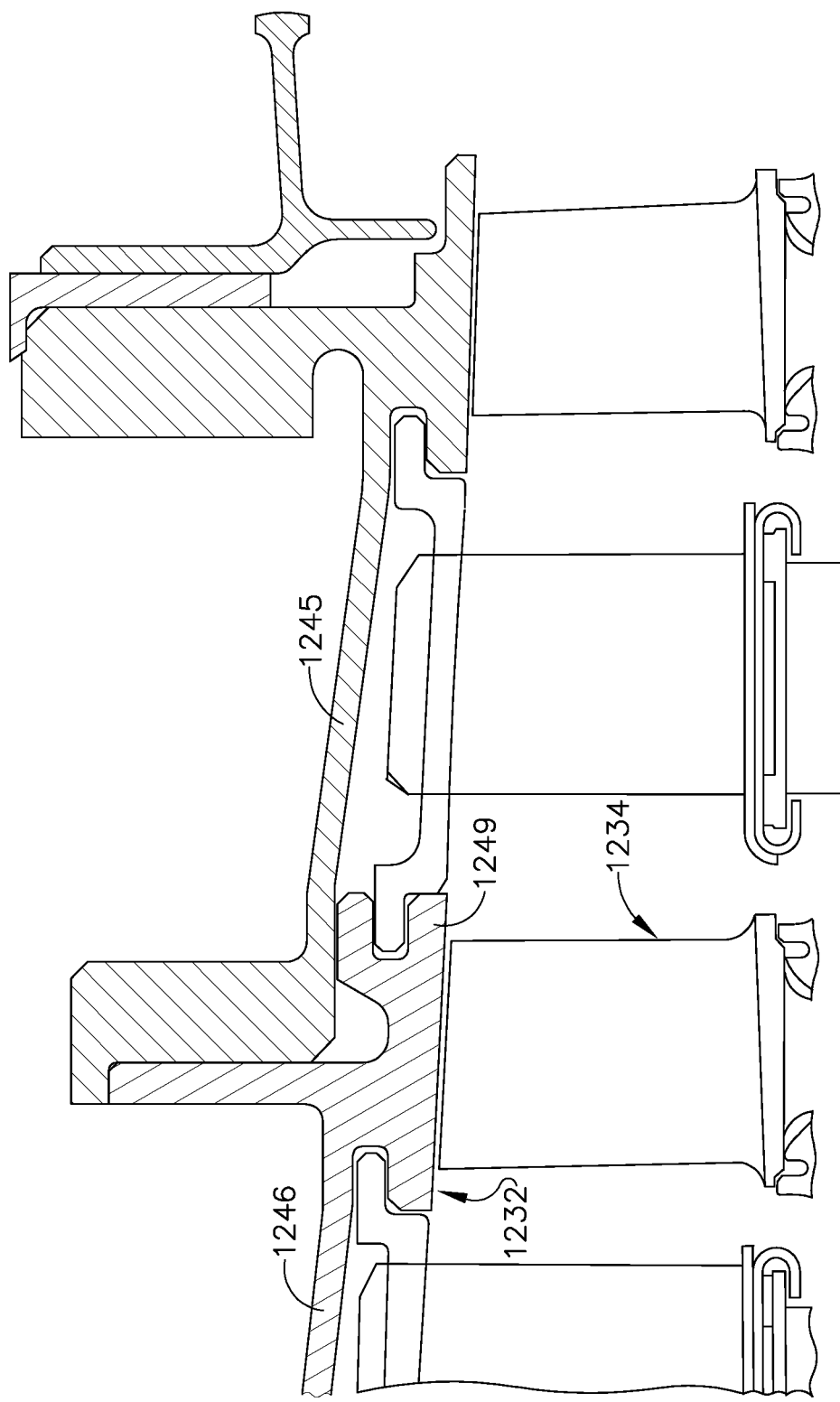
FIG. 14 is an alternate embodiment of a control ring serving as a blade shroud ring.

Referring now to FIG. 14, an embodiment is depicted having aft cases 1245, 1246 wherein the aft case 1246 is formed of ceramic matrix composite. Accordingly, the aft case 1246 defines the blade shroud ring 1249 and the material inhibits growth as well as leakage between the rotor and stator components 1234, 1232.

Figure 15:
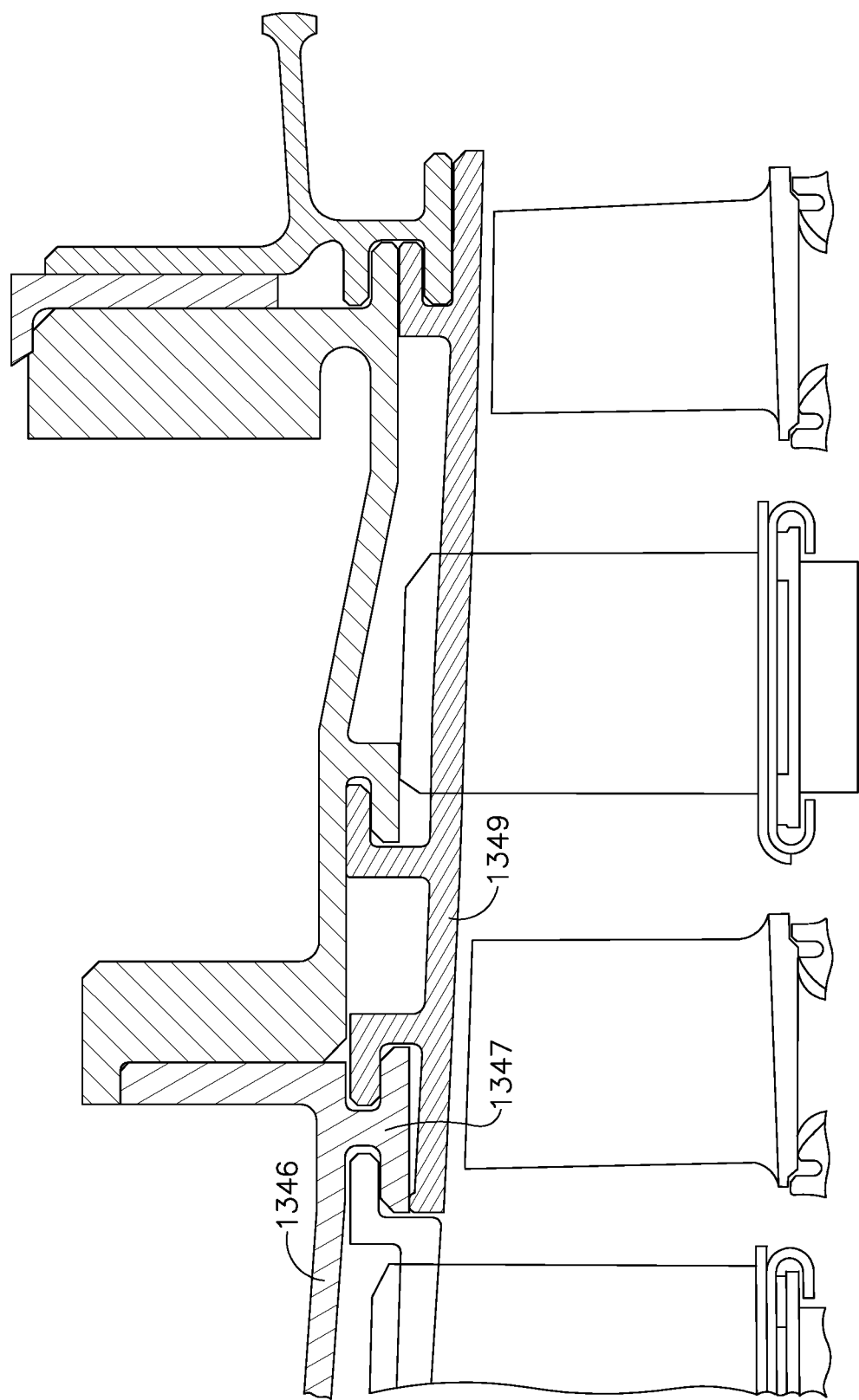
FIG. 15 is a further alternate embodiment of a control ring and integral blade shroud ring.

Referring now to FIG. 15, an embodiment is depicted wherein the aft case 1346 has a flange 1347 formed of ceramic matrix composite. The adjacent blade shroud ring 1349 is formed of material with higher coefficient of thermal expansion and grows more than the flange 1347. In operation, the flange 1347 functions as a growth limiter for the blade shroud ring 1349. This assembly also limits increase in the blade tip gap at the blade shroud ring 1349 and inhibits leakage.

Since the low alpha materials grow less than the adjacent hardware, and the need for an initial gap to maximize effectiveness, a biasing mechanism may optionally be utilized to keep the control ring positively located (concentric with adjacent stator components) at all times and conditions. The biasing force may be provided by various forms of springs in order to provide bias in the radial direction, axial direction or both. The biasing force maintains either or both of radial and axial constraint at shutdown, then deflects as the hardware requires. The spring also enables lower stresses in the CMC rings due to delayed engagement, which otherwise would prevent usage of low strength CMC rings for clearance control.

Figure 16:
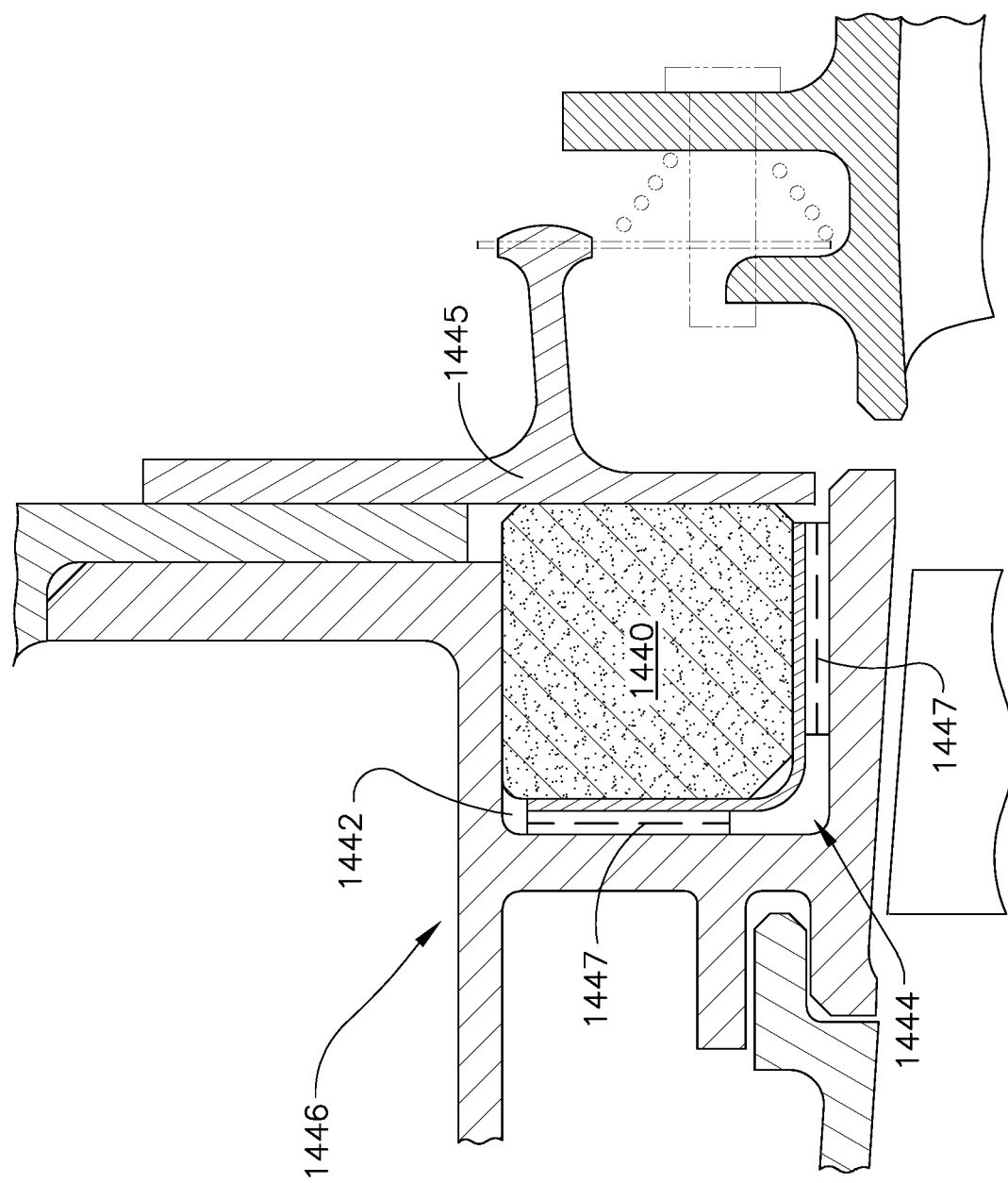
FIG. 16 is side section view of an alternate embodiment having a biasing mechanism.

Referring now to FIG. 16 a CMC ring 1440 is depicted between aft cases 1445, 1446. A gap 1442 is located between the cases 1446, 1445. This gap 1442 allows for growth of the CMC ring 1440 during operation of the engine. Located within the gap 1442 adjacent the CMC ring 1440 is a biasing mechanism 1444. The biasing mechanism 1444 is a spring according to the instant embodiment and provides an axial force and a radial force through the L-shaped shape having first leg and second leg. Each leg biases in one of an axial direction and a radial direction. Each leg may have one or more projections 1447 to engage an adjacent structure and provide a force on the ring 1440. The spring 1444 has a normal position when the engine is in a cool condition to locate the ring 1440. The spring 1444 inhibits the CMC ring 1440 from freely floating within the gap 1442.

Figure 17:
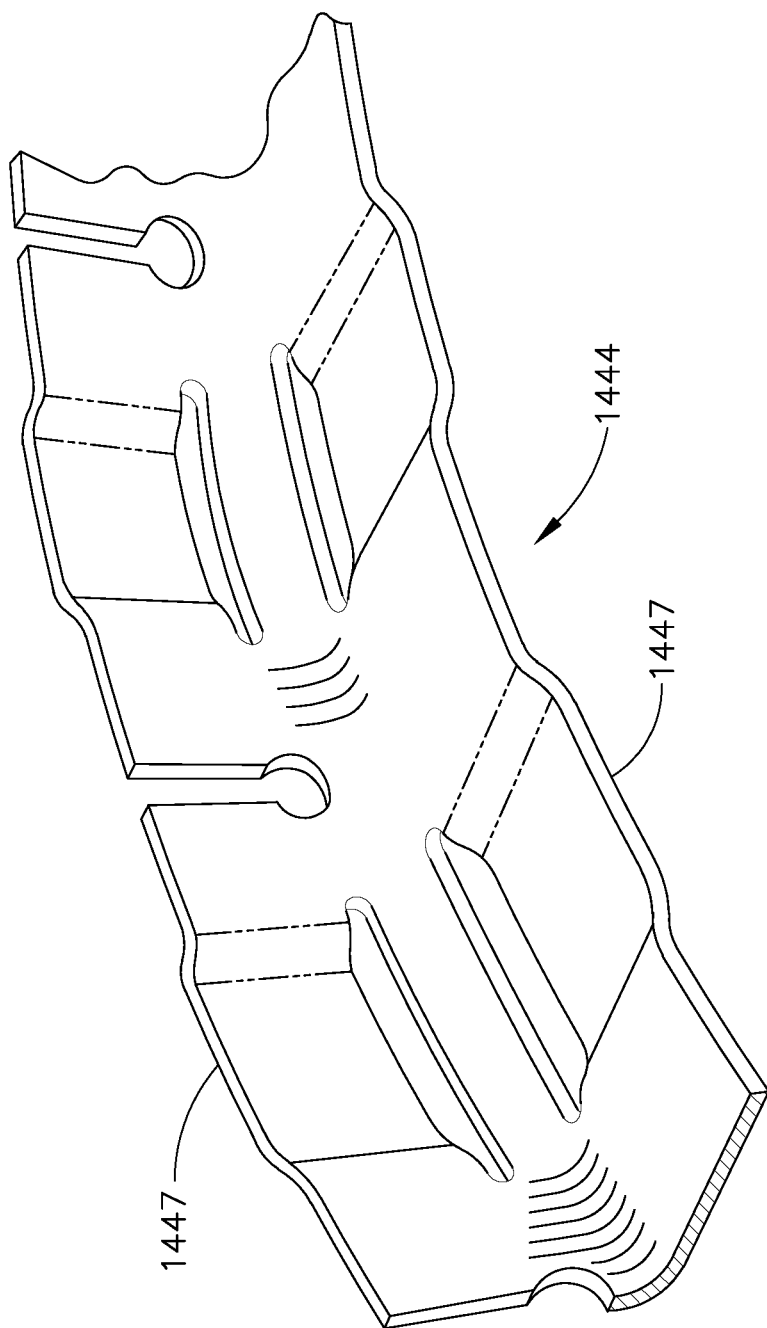
FIG. 17 is a partial isometric view of the embodiment of FIG. 16.

Referring now to FIG. 17, an isometric view of a portion of the structure 1444 is depicted. The biasing mechanism 1444 has first and second legs which are joined at an angle, for example about 90 degrees, however other shapes or angles may be utilized. Each of the legs includes a one or more projections 1447 which engage adjacent surfaces and may work to provide spring force in whole or in part with the legs of the mechanism 1444. The biasing mechanism 1444 is shown engaging the ring 1440 (FIG. 16) and may be a fully circumferential part or may be formed of segments which design a full circumferential structure or segments which define a partial circular shape.

As opposed to the embodiment of FIG. 16 wherein the CMC ring is disposed closer to the flowpath, a biasing mechanism may also be utilized in an embodiment wherein the CMC ring is disposed radially away from the flowpath. For example, referring again to FIG. 7, the CMC ring 540 is located between flanges radially spaced from the flowpath. A biasing mechanism 1444 may be seated between the flanges and the CMC ring 540 to positively position the ring 540 relative to the flanges of cases 546, 545.

Referring now to FIG. 18, a further embodiment is depicted with alternative biasing mechanisms. Disposed between cases 1546, 1545 is a CMC ring 1540, which includes at least one biasing mechanism 1544. In the instant embodiment, the CMC ring 1540 is biased in both axial and radial directions. The biasing mechanism 1544 is shown in perspective view in FIG. 19 and provides force in a radial direction. The biasing mechanism 1544 is a clip-like structure which wraps around the CMC ring 1540, in the instant embodiment, by spreading the ends of the spring 1544. Referring briefly to the perspective view of FIG. 21, the expander spring 1544 is disposed within channels along the radial outer surface of the CMC ring 1540. In the instant embodiment, two springs 1544 are utilized to provide biasing force in the radial direction of the engine.

Figure 20:
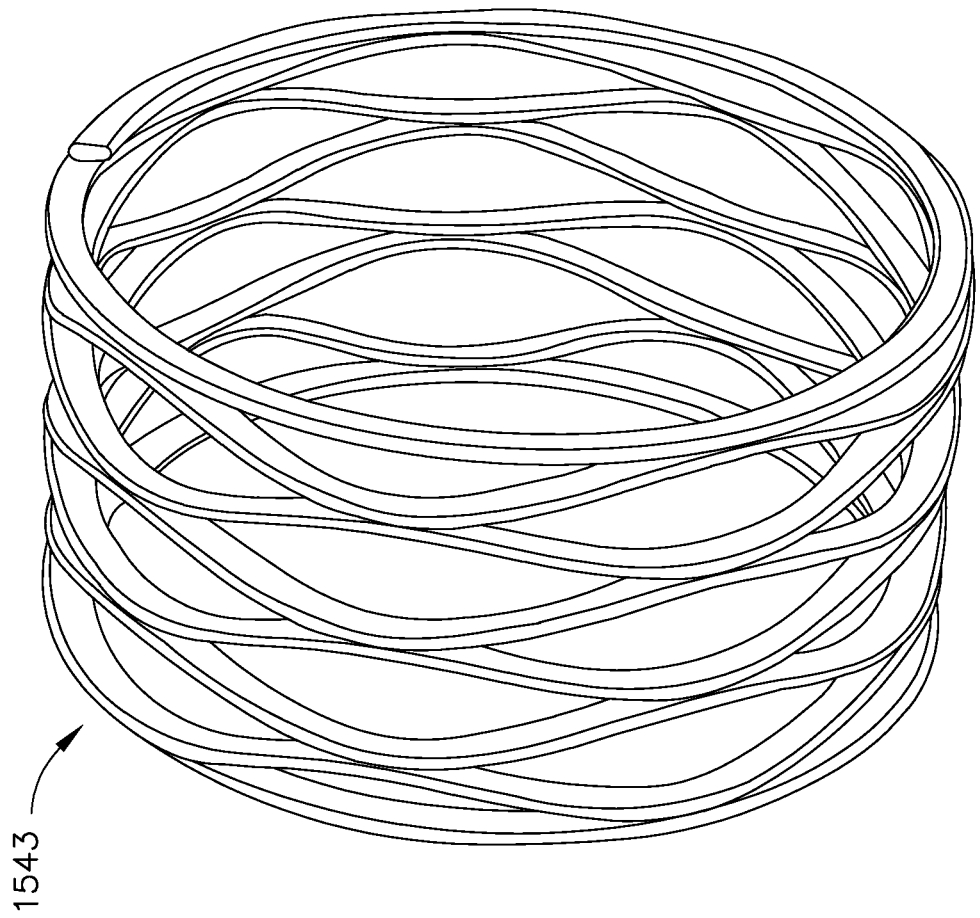
FIG. 20 is an isometric view of an alternate biasing mechanism of FIG. 19.
Figure 19:
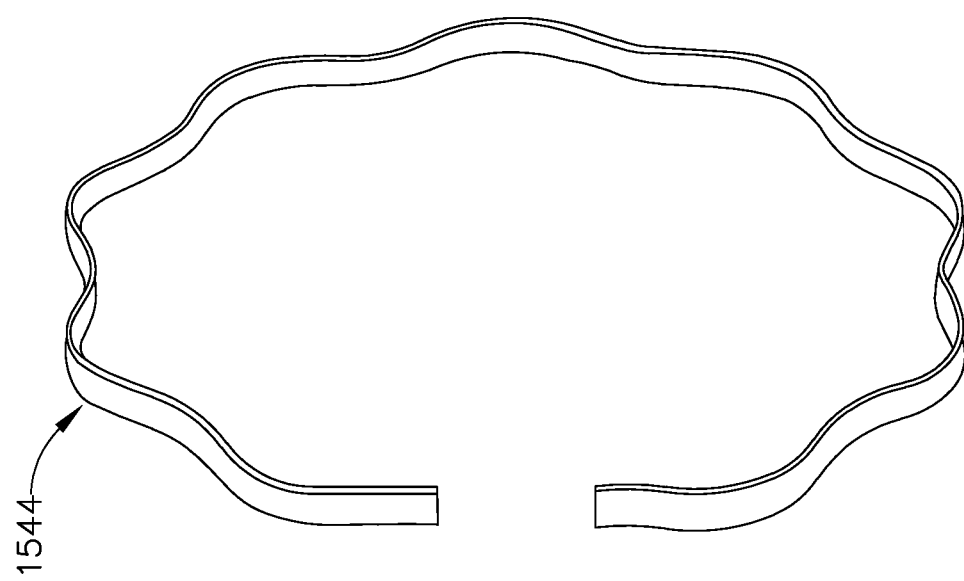
FIG. 19 is an isometric view of one embodiment of a biasing mechanism of FIG. 18.
Figure 21:
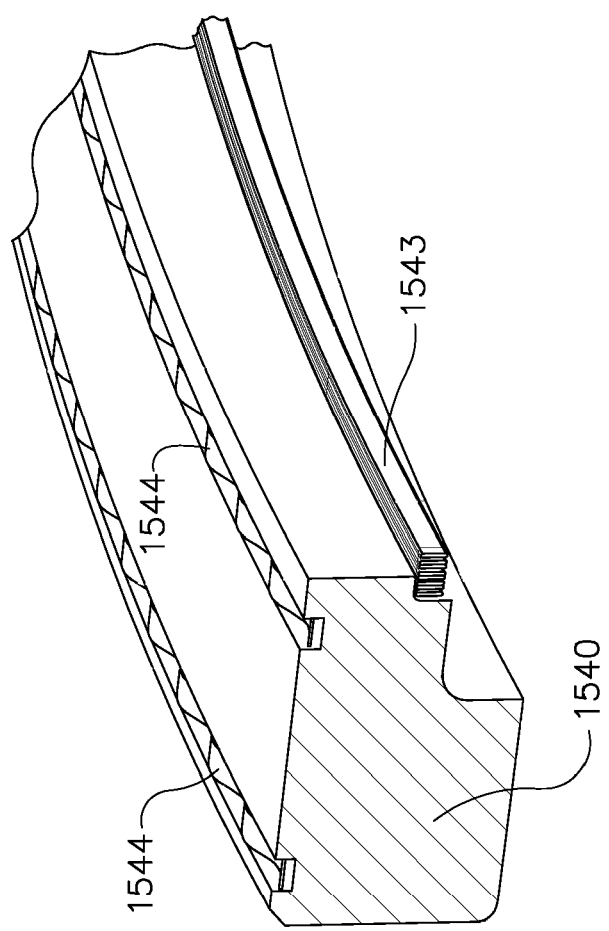
FIG. 21 is an isometric view of the embodiment of FIG. 18 with schematic representations of the biasing mechanisms of FIGS. 19 and 20.

Referring now to FIGS. 18, 20 and 21, an additional biasing mechanism 1543 is depicted which provides a biasing force in the axial direction of the engine. As with biasing mechanism 1544, the biasing mechanism 1543 may take various forms. However, the instant embodiment utilizes a spring 1543 which is generally cylindrical in shape. The spring 1543 further has a plurality of curved leaves with peaks and valleys which engage one another and provide biasing force or compensating for thermal expansion. In this way, the biasing mechanism 1543 positively positions the CMC ring 1540 but allows for some expansion in the axial direction. Similarly, the mechanism 1544 positively positions the CMC ring 1540 in the radial direction but compensates for expansion of the ring 1540 and biasing the ring 1540 once the engine cools. One skilled in the art will realize that these embodiments may be used with any of the previously described embodiments in the instant specification and others that may not be shown. Further, the biasing mechanisms 1543, 1544 may also function in radial, axial or other directions if so oriented.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A clearance control ring assembly, comprising:
   a stator component disposed opposite a rotor component within a gas turbine engine;
   a clearance control ring being formed of a single structure and extending circumferentially disposed radially outward of at least a portion of said stator component, said clearance control ring having a coefficient of thermal expansion lower than a coefficient of thermal expansion of said at least a portion of said stator component; and at least one spring disposed between the stator component and the clearance control ring, the at least one spring configured to provide a radial bias and an axial bias to the clearance control ring;

wherein said at least a portion of said stator component is limited from thermal expansion and limited from growth relative to said rotor component.

2. The clearance control ring assembly of claim 1, wherein said clearance control ring is disposed in a compressor of the gas turbine engine.

3. The clearance control ring assembly of claim 2, wherein said stator component includes a blade ring.

4. The clearance control ring assembly of claim 3, wherein said clearance control ring is disposed outwardly and circumferentially about said blade ring.

5. The clearance control ring assembly of claim 1, further comprising a mid-case ring disposed between a first aft case and a second aft case.

6. The clearance control ring assembly of claim 5, wherein the first aft case and the second aft case each has a flange.

7. The clearance control ring assembly of claim 6, wherein said clearance control ring is disposed between said flanges of the first aft case and the second aft case, respectively.

8. The clearance control ring assembly of claim 6, further comprising a gap between the flange of the first aft case and the flange of the second aft case.

9. The clearance control ring assembly of claim 1, wherein at least one surface of said clearance control ring is angled relative to an axis of said gas turbine engine.

10. The clearance control ring assembly of claim 1, wherein the at least one spring is L-shaped.

* * * * *